United States Patent
Cho et al.

(10) Patent No.: US 9,337,756 B2
(45) Date of Patent: May 10, 2016

(54) APPARATUS AND METHOD FOR CONTROLLING VIBRATION OF DRIVING MOTOR IN VEHICLE

(71) Applicant: Hyundai Motor Company, Seoul (KR)

(72) Inventors: Woo Cheol Cho, Daejeon (KR); Deok Keun Shin, Gyeonggi-Do (KR); Do Youn Jang, Daejeon (KR)

(73) Assignee: Hyundai Motor Company, Seoul (KR)

( * ) Notice: Subject to any disclaimer, the term of this patent is extended or adjusted under 35 U.S.C. 154(b) by 47 days.

(21) Appl. No.: 14/556,118

(22) Filed: Nov. 29, 2014

(65) Prior Publication Data

US 2016/0072417 A1  Mar. 10, 2016

(30) Foreign Application Priority Data

Sep. 5, 2014  (KR) .................... 10-2014-0118623

(51) Int. Cl.
*H02P 7/00* (2006.01)
*H02P 6/10* (2006.01)

(52) U.S. Cl.
CPC ........................................ *H02P 6/10* (2013.01)

(58) Field of Classification Search
CPC ............................ B62D 5/0463; B62D 5/0472
USPC ......... 318/48, 136, 400.01, 400.02, 700, 721, 318/799, 801, 400.12, 400.14, 400.15, 318/400.23, 430, 432, 434; 173/5, 180, 173/181; 307/124; 310/68 B; 388/930, 932; 415/30
See application file for complete search history.

(56) References Cited

U.S. PATENT DOCUMENTS 8,335,611 B2 * 12/2012 Wang .................. B62D 5/0472
701/41
8,626,394 B2 * 1/2014 Kezobo ............... B62D 5/0472
180/443

FOREIGN PATENT DOCUMENTS

| JP | 2003-219508 | A | 7/2003 |
| JP | 2004-104981 | A | 4/2004 |
| JP | 2008-219966 | A | 9/2008 |
| JP | 2010-274875 | A | 12/2010 |
| JP | 2013-013302 | | 1/2013 |
| KR | 2010-0104639 | A | 9/2010 |
| KR | 10-1192199 | B1 | 10/2012 |

* cited by examiner

*Primary Examiner* — Antony M Paul
(74) *Attorney, Agent, or Firm* — Mintz Levin Cohn Ferris Glovsky and Popeo, P.C.; Peter F. Corless

(57) ABSTRACT

The present disclosure provides an apparatus and a method for controlling a vibration of a driving motor in a vehicle by generating a vibration reduction torque using gains that correspond to a torque variation and an RPM of a driving motor. The method includes storing a gain table in which gain values that correspond to a torque variation and a revolution per minute (RPM) of a driving motor in a vehicle are recorded. The torque variation of the driving motor and the RPM of the driving motor are detected. The gain values are determined using the detected torque variation and RPM of the driving motor based on the gain table and reducing. In addition, a vibration of the driving motor is reduced based on the determined gain values.

14 Claims, 2 Drawing Sheets

APPARATUS AND METHOD FOR CONTROLLING VIBRATION OF DRIVING MOTOR IN VEHICLE

CROSS-REFERENCE TO RELATED APPLICATION(S)

Pursuant to 35 U.S.C. §119(a), This application this application claims priority to Korean Patent Application No. 10-2014-0118623, filed on Sep. 5, 2014, the disclosure of which is incorporated herein in its entirety by reference.

BACKGROUND

1. Technical Field

The present disclosure relates to an apparatus and a method for controlling a vibration of a driving motor within a vehicle, and more particularly, to a technology of variably setting a gain of a vibration reduction torque used to reduce a vibration of a driving motor generated from a vehicle which is being driven by a motor.

2. Background Art

In vehicles which drive wheels using a motor, such as hybrid electric vehicles, electric vehicles, and fuel cell vehicles, vibration occurs due to the driving motor. Such vehicles generally include vibration reduction (anti-jerk) logic to reduce the vibration. It should be understood that vibration reduction logic means logic which applies a positive torque or a negative torque to vibration components of the driving motor, based on a currently generated torque to reduce the vibration.

The typical vibration reduction apparatus for a driving motor within a vehicle determines the vibration reduction torque by multiplying the vibration components of the motor by a gain which does not consider a driving state of the vehicle (such a driving state may include, but is not limited to: tip-in, tip-out, creep, braking, or the like). Therefore, the typical vibration reduction apparatus may suffer from a disadvantage, in that vibration reduction performance may be degraded and the vibration reduction torque may be applied to an unnecessary component. Consequently, the typical vibration reduction apparatus for a driving motor within a vehicle has a problem in that gains independent of a torque variation and an RPM (i.e., revolutions per minute) of the motor are used in vibration reduction calculations without considering a change in the gain for calculating an optimal vibration reduction torque, depending on the torque variation of the motor and the revolution per minute (RPM) of the motor, and therefore the vibration reduction performance may be degraded or at least not substantially improved. Further, a typical vibration reduction apparatus for a driving motor within a vehicle has a problem in that the gains corresponding to the vibration components of the motor are used in vibration reduction calculations without considering the fact that a specific RPM area of the driving motor causes resonance with a transfer system of the vehicle and thus the vibration reduction torque may cause or contribute to the vibration.

SUMMARY

The present disclosure provides an apparatus and a method for controlling a vibration for a driving motor within a vehicle, that may improve vibration reduction performance by generating a vibration reduction torque using gains that correspond to a torque variation and an RPM of the driving motor. The foregoing and other objects, features, aspects and advantages of the present invention will be understood and become more apparent from the following detailed description of the present invention. Also, the objects and advantages of the present invention may be realized by the units and combinations thereof recited in the claims.

According to an exemplary embodiment of the present disclosure, an apparatus for controlling a vibration of a driving motor in a vehicle may include a gain table storage unit configured to store a gain table including gain value data that correspond to a torque variation value and a revolution per minute (RPM) value for the driving motor within the vehicle; a torque variation detector configured to detect the torque variation of the driving motor; an RPM detector configured to detect the RPM of the driving motor; a controller configured to determine the gain values using the torque variation of the driving motor detected by the torque variation detector and the RPM of the driving motor detected by the RPM detector, based on the gain table; and a vibration reducer configured to reduce the vibration of the driving motor based on the gain values determined by the controller.

According to another exemplary embodiment of the present disclosure, a method for controlling a vibration of a driving motor in a vehicle may include storing a table (hereinafter, gain table) in which gain values that correspond to a torque variation and a revolution per minute (RPM) of a driving motor within the vehicle are recorded; detecting the torque variation of the driving motor; detecting the RPM of the driving motor; determining the gain values using the detected torque variation and RPM of the driving motor based on the gain table; and reducing the vibration of the driving motor based on the determined gain values.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
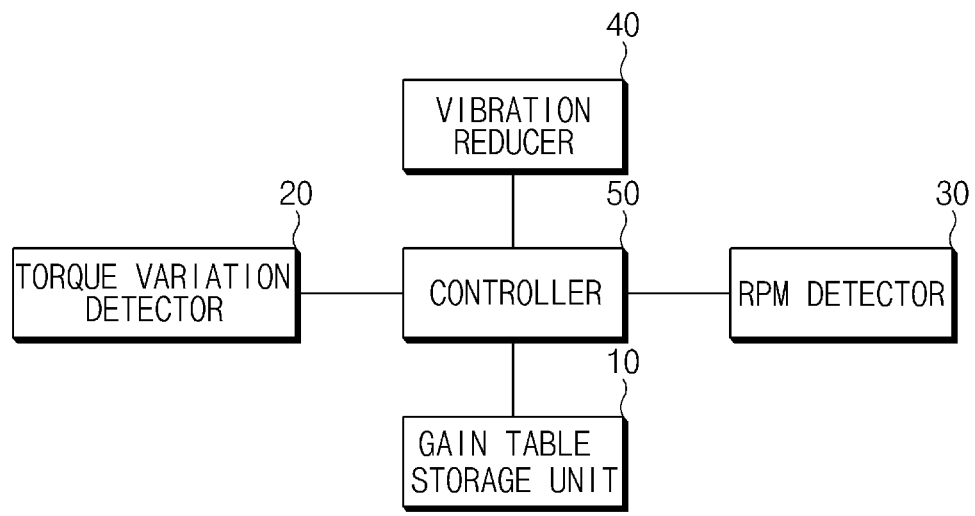
FIG. 1 is an exemplary configuration diagram of an apparatus for controlling a vibration of a driving motor in a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 is an exemplary configuration diagram of an apparatus for controlling a vibration of a driving motor within a vehicle according to an exemplary embodiment of the present disclosure. As illustrated in FIG. 1, an apparatus for controlling a vibration of a driving motor in a vehicle may include a gain table storage unit 10, a torque variation detector 20, an RPM detector 30, a vibration reducer 40, and a controller 50. The controller 50 may be configured to operate other components of the apparatus for controlling vibration, including, but not limited to the gain table storage unit, 10, the torque variation detector 20, the RM detector 30 and the vibration reducer 40. The gain table storage unit 10 may be configured to store a gain table in which gain values that correspond to a torque variation and an RPM of the driving motor which drives wheels of a vehicle may be recorded. The gain values recorded in the gain table may be different for each vehicle model.

The following table 1 is an example of the gain table including a low-speed section in which the RPM ranges from about 0 to 500, a resonance section in which the RPM ranges from about 500 to 1500, a middle-speed section in which the RPM ranges from about 1500 to 6000, and a high-speed section in which the RPM is about 6000 or greater.

TABLE 1

| RPM | Variation of torque (Nm) | | | | | | | | | |
|---|---|---|---|---|---|---|---|---|---|---|
| | 2 | 4 | 6 | 8 | 10 | 12 | 14 | 16 | 18 | 20 |
| From 0 to 150 | 2 | 2.2 | 2.4 | 2.6 | 2.8 | 3 | 3.2 | 3.4 | 3.6 | 3.8 |
| From 150 to 300 | 1.8 | 2 | 2.2 | 2.4 | 2.6 | 2.8 | 3 | 3.2 | 3.4 | 3.6 |
| From 300 to 500 | 1.5 | 1.7 | 1.9 | 2.1 | 2.3 | 2.5 | 2.7 | 2.9 | 3.1 | 3.3 |
| From 500 to 1000 | 0.5 | 0.54 | 0.58 | 0.62 | 0.66 | 0.7 | 0.74 | 0.78 | 0.82 | 0.86 |
| From 1000 to 1500 | 0.2 | 0.22 | 0.24 | 0.26 | 0.28 | 0.3 | 0.32 | 0.34 | 0.36 | 0.38 |
| From 1500 to 2000 | 0.5 | 0.54 | 0.58 | 0.62 | 0.66 | 0.7 | 0.74 | 0.78 | 0.82 | 0.86 |
| From 2000 to 4000 | 1 | 1.2 | 1.4 | 1.6 | 1.8 | 2 | 2.2 | 2.4 | 2.6 | 2.8 |
| From 4000 to 6000 | 1.5 | 1.7 | 1.9 | 2.1 | 2.3 | 2.5 | 2.7 | 2.9 | 3.1 | 3.3 |
| From 6000 to 8000 | 1 | 1.2 | 1.4 | 1.6 | 1.8 | 2 | 2.2 | 2.4 | 2.6 | 2.8 |
| From 8000 to 10000 | 0.5 | 0.55 | 0.6 | 0.65 | 0.7 | 0.75 | 0.8 | 0.85 | 0.9 | 0.95 |
| 10000 or more | 0.3 | 0.33 | 0.36 | 0.39 | 0.42 | 0.45 | 0.48 | 0.51 | 0.54 | 0.57 |

The table shows RPM range values in the left-most column and variation of torque in Newton meters (Nm) in the top row. Illustrative gain values are shown where a given RPM range intersects with a given torque variation. The following rules may be appreciated from the above Table 1.

1. For each RPM range of the driving motor i, the torque variation of the driving motor varies directly with the gain value, (i.e., for RPM values in a given range, a greater torque variation, corresponds with a greater gain value). In other words, since the vibration of the vehicle may be severe in the section in which the torque variation of the driving motor is substantial and therefore the magnitude of the vibration reduction torque is substantial, the gain value may also be substantial.

For example, when the RPM of the driving motor ranges from about 300 to 500, and when the torque variation is about 4, the gain value may be about 1.7 but when the torque variation is about 16 (and therefore greater than about 4), the gain value may be about 2.9 (likewise, greater than about 1.7). Further, when the torque variation is about 3 and is set to be an intermediate value between the gain value when the torque variation is about 4 and a gain value when the torque variation is about 5. In the table 1, an intermediate value between about 1.5 and about 1.7 may be interpolated as about 1.6.

2. In the low-speed section, the resonance section, and the high-speed section, when the torque variations of the driving motor are the same, the RPM of the driving motor varies inversely with the gain value, (i.e., the greater the RPM of the driving motor, the smaller the gain value). For example, when the torque variation is 6, and when the RPM of the driving motor is 6100, the gain value may be about 1.4 and when the RPM of the driving motor is 8100, the gain value may be about 0.6.

3. In the middle-speed section, when the torque variations of the driving motor are about the same, the RPM value of the driving motor varies directly with the gain value, (i.e., the greater the RPM of the driving motor, the greater the gain value). For example, when the torque variation is about 12, and when the RPM of the driving motor is about 1600, the gain value is about 0.7 and when the RPM of the driving motor is about 4100, the gain value may be 2.5.

4. The gain value set in the resonance section is set to be a smaller value than a reference value. For example, when the torque variation is about 2, and when the RPM is about 0, the gain value may be about 2, when the RPM is about 150, the gain value may be about 1.8, when the RPM is about 300, the gain value is about 1.5, when the RPM is about 500, the gain value may be about 0.5, and when the RPM is about 1000, the gain value may be about 0.2.

It may be appreciated that the gain value shows the reduction in about 0.2 to about 0.3 until the RPM is less than about 500 (low-speed section), while when the RPM is about 500 (resonance section), the gain value may be about 0.5 and thus the reduction rate of the gain value is increased. In particular, the reference value may be set to be about 1.2 to 1.3.

The torque variation detector 20 may be configured to detect the torque variation of the driving motor. A technology of detecting the torque variation of the driving motor is known in the art and therefore a detailed description thereof will be omitted. The RPM detector 30 may be configured to detect the RPM of the driving motor. The vibration reducer 40 may be configured to use the gain value from the controller 50 to reduce the vibration of the driving motor. In other words, the vibration reducer 40 may be configured to multiply the gain value from the controller 50 by a vibration component of the motor to generate the vibration reduction torque and then reduce the vibration of the driving motor based on the generated vibration reduction torque. The controller 50 may be configured to operate each component. In particular, the controller 50 may be configured to determine the gain value using the torque variation of the driving motor detected by the torque variation detector 20 and the RPM of the driving motor detected by the RPM detector 30 based on the gain table. Further, the controller 50 may be configured to transfer the detected gain value to the vibration reducer 40.

Figure 2:
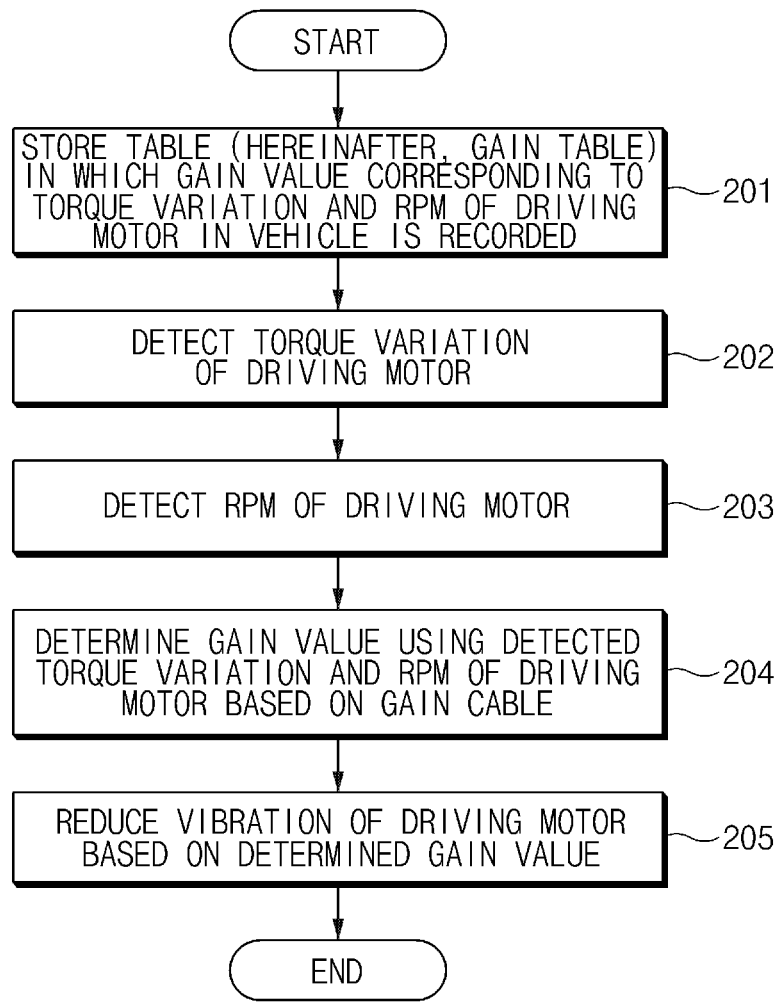
FIG. 2 is an exemplary flow chart of a method for controlling a vibration of a driving motor in a vehicle according to an exemplary embodiment of the present disclosure.

FIG. 2 is an exemplary flow chart of a method for controlling a vibration of a driving motor in a vehicle according to an exemplary embodiment of the present disclosure. According to an exemplary method, the gain table storage unit 10 may be configured to store a gain table including the gain values that correspond to the torque variation and the revolution per minute (RPM) of the driving motor within the vehicle (201). The torque variation detector 20 may be configured to detect the torque variation of the driving motor (202). The RPM detector 30 may be configured to detect the RPM of the driving motor (203). In addition, the controller 50 may be configured to determine the gain value using the torque variation of the driving motor detected by the torque variation detector 20 and the RPM of the driving motor detected by the RPM detector 30 based on the gain table (204). The vibration reducer 40 may be configured to reduce the vibration of the driving motor based on the gain value determined by the controller 50 (205).

The method according to the exemplary embodiment of the present disclosure as described above may be executed by a computer program. Further, a code and a code segment configuring the program may be easily inferred by a computer programmer in the art. Further, the prepared program may be stored in a computer-readable recording medium (information storage medium) and may be read and run by the computer, thereby implementing the method according to the exemplary embodiment of the present disclosure. Further, the recording medium may include all the types of recording media which may be read by the computer.

As described above, according to the exemplary embodiments of the present disclosure, it may be possible to improve vibration reduction performance by generating the vibration reduction torque using the gains that correspond to the torque variation and the RPM of a driving motor. Further, according to the exemplary embodiments of the present disclosure, it may be possible to prevent a resonance phenomenon form occurring by setting the gain to be less than a reference value in the specific RPM area in which the driving motor of the vehicle causes the resonance with the transfer system.

The present invention described above may be variously substituted, altered, and modified by those skilled in the art to which the present invention pertains without departing from the scope and spirit of the present invention. Therefore, the present invention is not limited to the above-mentioned exemplary embodiments and the accompanying drawings.

What is claimed is:

1. An system for controlling a vibration of a driving motor in a vehicle, comprising:
    a memory configured to store program instructions; and
    a controller configured to execute the program instructions, the program instructions when executed configured to:
        receive gain table data from a gain table storage unit configured to store a gain table including gain value data that correspond to a torque variation value and a revolution per minute (RPM) value for the driving motor in the vehicle;
        receive a torque variation value from a torque variation detector configured to detect the torque variation of the driving motor;
        receive an RPM value from an RPM detector configured to detect the RPM of the driving motor, wherein the controller is configured to determine the gain values using the torque variation of the driving motor detected by the torque variation detector and the RPM of the driving motor detected by the RPM detector, based on the gain table; and
        operate a vibration reducer configured to reduce the vibration of the driving motor based on the gain values determined by the controller.

2. The system according to claim 1, wherein for a selected RPM range of the driving motor, the torque variation of the driving motor varies directly with the gain value data.

3. The apparatus according to claim 1, wherein in the gain table, the RPM value of the driving motor is divided into a low-speed section, a resonance section, a middle-speed section, and a high-speed section in a magnitude order of the RPM value.

4. The apparatus according to claim 3, wherein in the low-speed section, the resonance section, and the high-speed section, when the torque variation of the driving motor is about the same, the RPM of the driving motor varies inversely with the gain value data.

5. The apparatus according to claim 3, wherein in the middle-speed section, when the torque variations of the driving motor are about the same, the RPM of the driving motor varies directly with the gain value data.

6. The apparatus according to claim 3, wherein in the gain table, the gain values equal to or less than a reference value are set in the resonance section.

7. A method for controlling a vibration of a driving motor in a vehicle, comprising:
    storing, by a controller, a gain table in which gain values that correspond to a torque variation and a revolution per minute (RPM) of a driving motor in a vehicle are recorded;
    detecting, by the controller, the torque variation of the driving motor;
    detecting, by the controller, the RPM of the driving motor;

determining, by a controller, the gain values using the detected torque variation and RPM of the driving motor based on the gain table; and reducing, by the controller, a vibration of the driving motor based on the determined gain values.

8. The method according to claim 7, wherein for a selected RPM range of the driving motor, the torque variation of the driving motor varies directly with gain value data.

9. The method according to claim 7, wherein the gain table includes for the RPM value ranges of the driving motor: a low-speed section, a resonance section, a middle-speed section, and a high-speed section in a magnitude order of the RPM value.

10. The method according to claim 9, wherein in the low-speed section, the resonance section, and the high-speed section, when the torque variation of the driving motor is the same, the RPM of the driving motor varies inversely with the gain value data.

11. The method according to claim 9, wherein in the middle-speed section, when the torque variations of the driving motor are the same, the RPM of the driving motor varies directly with the gain value data.

12. The method according to claim 9, wherein in the gain table, the gain values equal to or less than a reference value are set in the resonance section.

13. A non-transitory computer readable medium containing program instructions executed by a processor for controlling a vibration of a driving motor in a vehicle, the computer readable medium comprising:

program instructions that store a gain table in which gain values that correspond to a torque variation and a revolution per minute (RPM) of a driving motor in a vehicle are recorded;

program instructions that receive a torque variation of the driving motor detected by a torque variation detector, from the torque variation detector;

program instructions that receive an RPM of the driving motor, detected by an RPM detector, from the RPM detector;

program instructions that determine the gain values using the detected torque variation and RPM of the driving motor based on the gain table; and program instructions that operate a vibration reducer to reduce a vibration of the driving motor based on the determined gain values.

14. The non-transitory computer readable medium of claim 13, wherein for a selected RPM range of the driving motor, the torque variation of the driving motor varies directly with gain value data and wherein the gain table includes for the RPM value ranges of the driving motor: a low-speed section, a resonance section, a middle-speed section, and a high-speed section in a magnitude order of the RPM value.

* * * * *